United States Patent [19]

Shih et al.

[11] Patent Number: 4,772,674

[45] Date of Patent: Sep. 20, 1988

[54] SOLVENTLESS PROCESS FOR PRODUCING DIALKYL FUMARATE-VINYL ACETATE COPOLYMERS

[75] Inventors: Chung Kun Shih; Craig W. Gleason, both of Scotch Plains, N.J.; Edmund H. Braun, II, Orangeburg, N.Y.

[73] Assignee: Exxon Chemical Patents Inc., Linden, N.J.

[21] Appl. No.: 943,613

[22] Filed: Dec. 18, 1986

[51] Int. Cl.$^4$ .................. C08F 222/10; C08F 220/12; C08F 218/02

[52] U.S. Cl. ................................. 526/325; 526/329.5; 526/330; 252/56 D; 252/56 R

[58] Field of Search ..................... 526/325, 329.5, 330; 252/56 D, 56 R

[56] References Cited

U.S. PATENT DOCUMENTS

| | | | |
|---|---|---|---|
| 2,200,437 | 5/1940 | Voss et al. | 260/86 |
| 2,448,531 | 9/1948 | Kenyan et al. | 526/325 |
| 2,580,053 | 12/1951 | Tutwiler et al. | 526/325 |
| 2,825,717 | 4/1958 | Cashman et al. | 260/78.5 |
| 2,876,213 | 3/1959 | Bartlett et al. | 260/78.5 |
| 2,936,300 | 5/1960 | Tutwiler et al. | 260/78.5 |
| 3,507,908 | 4/1970 | Young et al. | 260/485 |
| 4,220,744 | 9/1980 | Tulacs et al. | 526/86 |

*Primary Examiner*—Joseph L. Schofer
*Assistant Examiner*—N. Sarofim
*Attorney, Agent, or Firm*—R. A. Maggio

[57] ABSTRACT

Process for the bulk polymerization of vinyl acetate with a diester are disclosed which are carried out in the absence of a solvent and including reacting the vinyl acetate and fumaric acid diester with a peroxide catalyst at specified molar ratios and up to reaction temperatures of from 255° to 320° F. to produce fumarate vinyl acetate copolymers having number average molecular weight below 50,000 for use as lubricating oil and fuel oil additives.

9 Claims, No Drawings

4,772,674

SOLVENTLESS PROCESS FOR PRODUCING DIALKYL FUMARATE-VINYL ACETATE COPOLYMERS

FIELD OF THE INVENTION

The present invention relates to processes for the copolymerization of vinyl acetate and specific diesters. More particularly, the present invention relates to processes for the preparation of lubricating oil and fuel oil additives. Still more particularly, the present invention relates to improved processes for the preparation of pour point depressing lubricating oil additives and wax crystal modifiers for fuels by copolymerizing a diester and an unsaturated polycarboxylic acid in the presence of a peroxide catalyst.

BACKGROUND OF THE INVENTION

In the field of lubricating oil additives, it has been known for many years that various polymers and copolymers can be used as additives for improving a number of the desirable characteristics of these lubricating oils. For instance, certain of these additives have been found to be useful for improving the viscosity index or the rate of change of viscosity of various oil compositions with changes in temperatures, and/or for improving the pour point of lubricating oils, that is lowering the temperature at which they lose their flow properties, as well as other such lubricating oil properties. In particular, it has been known for many years that various polymers and copolymers of acrylate esters, and polymers and copolymers of alpha-beta unsaturated polycarboxylic acid esters have potential utility for such purposes. These compounds, and particularly the copolymers of vinyl acetate and dialkyl fumarates, have been found to be particularly useful for such purposes. Thus, these fumarate vinyl acetate copolymers have been used commercially as lubricating oil additives, primarily because of their ability to act as lubricating oil flow improvers. These compounds can also be used as wax crystal modifiers, such as cloud point depressants for diesel fuels, and as flow improvers for middle distillates and heavy fuels.

In particular, it is shown in Cashman et al, U.S. Pat. No. 2,825,717, that these additives can be produced by the copolymerization of certain polycarboxylic acid esters, and most particularly fumaric acid diesters and maleic acid diesters, with other polymerizable materials, such as vinyl compounds, and most particularly vinyl acetate, in the presence of a peroxide catalyst, in an alkaline medium. The processes disclosed in Cashman et al thus include both bulk polymerization and solution polymerization processes in which the reaction is run at temperatures of up to 250° F., but preferably between about 100° and 200° F., in the presence of an alkaline medium. This alkaline medium is essential to the Cashman et al process apparently in order to neutralize the residual acid in the first step of the Cashman et al processes, in which the fumarate is prepared. The processes disclosed in Cashman et al, however, have not proven to be commercially sufficient, and the actual commercial processes for the production of these additives have almost exclusively been conducted in the presence of a solvent, such as heptane, hexane, or cyclohexane.

Furthermore, Tutwiler et al, U.S. Pat. No. 2,936,300, discloses processes for the copolymerization of vinyl acetate with a dialkyl fumarate in which the reactants are mixed with a solvent or diluent such as white oil in the presence of peroxide catalysts, such as benzoyl peroxide, with cooling to absorb the heat of polymerization so that the reactions are run at temperatures of from 50° to 125° C. (122° to 257° F.). Also, Young et al, U.S. Pat. No. 3,507,908, discloses the copolymerization of dialkyl fumarate with vinyl esters in the presence of a trialkyl aluminum catalyst utilizing a solvent polymerization reaction. These patents are typical of those processes, such as the commercial production of the fumarate vinyl acetate copolymers, in which it has been believed that the presence of a solvent was essential thereto. This was believed necessary not only to maintain a workable viscosity, but even more importantly to act as a chain transfer agent in order to terminate these free radical catalytic reactions. It was therefore believed that the molecular weight of the copolymer produced thereby, without the presence of a solvent, would become far too great, and considerably above the desired molecular weight for these products intended for use as fuel and lubricating oil additives. It was also believed that the presence of the evaporation of the solvent was necessary so as to moderate the reaction temperatures of these exothermic reactions.

Other patents have discussed bulk polymerization processes of various kinds. These include Voss et al, U.S. Pat. No. 2,200,437, in which vinyl esters of organic acids, including vinyl acetate, are polymerized in the presence of peroxides of the fatty acids containing at least 16 carbon atoms, with the patentee contending that they unexpectedly discovered that by using such catalysts higher molecular weight polymerization products can be produced, specifically compared to the use of catalysts such as dibenzoyl peroxide and the like. In particular, in example 4 of this patent the vinyl acetate is copolymerized with maleic acid dimethyl ester with oleic acid peroxide at 80° C. (176° F.). This disclosure does not mention, however, the fumarates as a candidate for any of the copolymerization reactions thereof. The maleic acid esters of Voss et al are not, however, nearly as effective as pour point depressants as are the fumarate copolymers of the present invention. Trulacs et al, U.S. Pat. No. 4,220,744, discloses other bulk polymerization processes, in this case employing acrylic monomers and minor quantities of alpha, beta-unsaturated monomers therewith.

The search has therefore continued for commercially acceptable process for copolymerization of vinyl acetate and fumaric acid diesters for the production of these fuel and lubricating oil additives which can be conducted on a commercial scale in the absence of a solvent medium.

SUMMARY OF THE INVENTION

In accordance with the present invention, these and other objects have now been overcome by the discovery of a bulk polymerization process which can be conducted in the substantial absence of a solvent and in the substantial absence of an alkaline medium, and which can result in the production of polymers with the desired low molecular weight on a commercial scale. By utilizing the process of the present invention, it is therefore possible to not only simplify the commercial production of these additives, to eliminate the need for using solvents such as cyclohexane in the commercial processes themselves, and to thereby increase reactor capacity by up to about 20%, and reduce the overall cycle time required for processing of this type by about 35%, but this can now be done while minimizing hydrocarbon emissions, and thereby aid in resolving the potential air emission problems associated therewith. In particular, these benefits are achieved by applicants' discovery of a process for the bulk polymerization of vinyl acetate and diesters which comprises reacting vinyl acetate with an unsaturated fumaric acid diester in the presence of a peroxide catalyst, in which the molar ratio of the vinyl acetate to the fumaric acid diesters is less than 1 and preferably from about 0.75 to about 0.85, and permitting the reaction to proceed exothermically up to a predetermined reaction temperature of between about 255° and about 320° F. and preferably between about 275° and 295° F., at elevated pressures between about 12 and 25 psig, and preferably between about 17 and 21 psig, so as to produce fumarate vinyl acetate copolymer therefrom having a number average molecular weight of below about 50,000.

In accordance with one embodiment of the process of the present invention, the predetermined reaction temperature is maintained by cooling the reaction mass, and by controlling the rate at which the catalyst is charged thereto. This is preferably accomplished by cooling the reaction by means of heat exchange therewith.

In accordance with another embodiment of the process of the present invention, the fumaric acid diesters comprise $C_6$ through $C_{18}$ dialkyl esters.

In accordance with another embodiment of the process of the present invention, the peroxide catalyst comprises a peroxide having a half-life of greater than about five minutes at 212° F., and most preferably a dibenzoyl peroxide, and most preferably t-butyl peroctoate.

DETAILED DESCRIPTION

The specific unsaturated fumaric acid diesters which are to be copolymerized in accordance with the present invention have a general formula as follows,

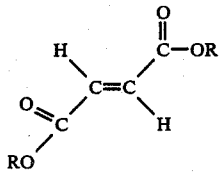

in which R represents alkyl groups of from 6 to 18 carbon atoms. However, mixtures of two or more of these fumaric acid diesters can be employed, and a mixture of various such diesters, in which the R groups vary from 6 to 18 carbon atoms, can be employed.

These diesters can themselves be prepared by an esterification reaction between unsaturated polycarboxylic acids or their corresponding anhydrides as is well known in the art, and as for example is specifically disclosed beginning at column 2, line 35 of Cashman et al, U.S. Pat. No. 2,825,717, which disclosure is incorporated herein by reference thereto.

More specifically, primary alcohols used for esterification are preferred over secondary and tertiary alcohols, although secondary alcohols are sometimes suitable. The alcohols are preferably saturated, although some degree of unsaturation is permissible when mixtures of alcohols are employed. Straight chain or lightly branched alcohols are preferred over highly branched alcohols.

As noted above, copolymerization of these diesters is carried out with vinyl acetate. This reaction is carried out in the presence of a peroxide catalyst. The peroxide catalysts which can be employed in the process of this invention must remain active for reasonable time periods in order to be effective. This is particularly true in accordance with the present process because it is carried out at elevated temperatures of above about 255° F., and many of the proxides will not remain effective at such conditions. More specifically, a measure of this quality is the "half-life" of these peroxides, namely the time required at a specified temperature to effect a loss of one-half of the peroxide's active oxygen content. The peroxide catalysts to be used in accordance with the present invention must have a half-life of at least about 5 minutes at 212° F., and preferably at least about 10 minutes at 212° F. These peroxides include the dibenzoyl peroxides, acetyl peroxide, t-butyl hydroperoxide, t-butyl perbenzoate, etc., with dibenzoyl peroxides being preferred for use therein, and with t-butyl peroctoate being particularly preferred therein. The dibenzoyl peroxide sold commercially as LUCIDOL-70, for example, has a half-life of about 20 minutes at 212° F.

The process in accordance with the present invention is described as a bulk copolymerization process. By this it is meant that the polymerization is carried out in the presence of monomer reactants, as compared to solution polymerization for example. The present bulk copolymerization processes are thus defined as being carried out in the substantial absence of a solvent. A substantial absence of a solvent is meant to be specifically contrasted to prior commercial processes which employ solvent systems such as cyclohexane, generally in amounts of about 27% of the weight of dialkyl fumarate used therein. More specifically, and in accordance with the present invention, when peroxide catalysts are employed in the form of a powder, as with the LUCIDOL-70 dibenzoyl peroxide mentioned above, a small catalyst fluidizing amount, generally about 1 to 2% by weight, based on the weight of dialkyl fumarate, of a hydrocarbon oil-based carrier can be admixed with the powdered catalyst so as to aid in the delivery of the catalyst into the reactor. Thus, the requirement for bulk polymerization in the substantial absence of a solvent is not meant to exclude the presence of such minor amounts of a hydrocarbon oil. For one thing, as is noted above, the solvent systems of the prior art, such as those employing cyclohexane, require these solvents in such large amounts at least in part so that they will evaporate during the reaction and thus significantly effect the cooling of the reaction mass. Therefore, large amounts of these volatile solvents are required, and they must be removed so that they are not present in the final copolymer product. In contrast, the small permissible amount of hydrocarbon oil which is primarily acting as a carrier for the powdered peroxide catalyst is selected to be non-volatile under reaction conditions, and in fact remains dispersed in the final copolymer product. More specifically, these hydrocarbons will preferably have a boiling point which is at least 20° C. above the maximum reaction temperature encountered during the copolymerization process of this invention, while the prior solvents such as cyclohexane are volatilized at the reaction conditions, including the lower temperatures of the prior art, and are present in amounts of from 20 to 30% of the dialkyl fumarate charged thereto. Any hydrocarbon oil conventionally employed as a base oil in lubricating oil formulations can be employed as a carrier as hereabove described.

It should also be noted that with peroxide catalysts in liquid form, even at the reaction temperatures and pressures contemplated herein, such as applicants' preferred t-butyl peroctoate, it is not necessary to combine the catalyst with any hydrocarbon or the like in order to render it easily deliverable to the reactor. Furthermore, it is possible, but somewhat more difficult, to deliver the peroxide catalyst in the form of a powder to the reactor without the assistance of a non-volatile hydrocarbon oil.

The reaction of the present invention is carried out by mixing the vinyl acetate with the fumaric acid diester in the presence of the peroxide catalyst in a reaction vessel. The reaction is initially heated to initiate the reaction, generally to a temperature of between 190° and 220° F., most preferably to a temperature of between about 200° and 210° F., at which point the reaction is initiated and the exothermic nature of the reaction causes the reaction temperature to increase. In accordance with the present invention, the reaction temperature is permitted to increase to a temperature of above about 255° F. and below about 320° F., most preferably between about 275° to 295° F. This being the case, it is necessary to maintain the reaction vessel under pressure, primarily to prevent the loss of vinyl acetate therefrom. Generally pressures of between about 12 and 25 psig, and most preferably about 17 and 21 psig, are preferred, with or without reflux therein.

Within the reaction vessel itself an important requirement is that the molar ratio of the vinyl acetate to the fumaric acid diester be less than about 1.0. Most particularly, molar ratios of between about 0.75 and 0.85 are preferred. It has thus been found that at molar ratios of vinyl acetate to the dialkyl fumarate of greater than about 1.1 the reactor will essentially gel, since the polymer will reach such a high molecular weight therein. Even if it does not gel, however, at these increased ratios the demulsibility of the final product will not be as required. That is, the polymer molecular structure of the product will be such that it will form a long-lasting emulsion in oil or fuel in the presence of water, a result which is highly undesirable in connection with these products. The product produced in accordance with the present invention, however, has a very significant demulsibility, and will thus meet the demulsibility specification according to ASTM D 1401. In this regard it is noted that in the Cashman et al patent discussed above, molar ratios of the vinyl acetate to the fumarate are about 1.29, far above the ratios usable in accordance with the present invention.

In accordance with the present process the reaction is maintained at the required temperature, and preferably from 275° to 295° F., for a period of one to six hours, preferably between two and four hours. It is not necessary to quench the reaction itself, since at the elevated temperatures of the present invention the peroxide catalyst decomposes, and the reaction itself is terminated. Any residual vinyl acetate present in the reaction product can be stripped therefrom in a conventional manner. At this point the product can be removed from the reactor and recovered.

The fumarate vinyl acetate copolymer produced in accordance with the process of the present invention will therefore have a number average molecular weight below about 50,000, and most preferably below about 25,000. In particular, number average molecular weights of between about 5,000 and 50,000 are employed, preferably between about 10,000 and 25,000, and most preferably between about 14,000 and 20,000. By "number average molecular weight" is meant such molecular weight as determined by Gel Permeation Chromatography, calibrated with a polystyrene standard. These molecular weights can also be compared to the considerably higher molecular weights of the polymer products produced in accordance with the process of the Cashman et al patent.

A typical example of a bulk copolymerization reaction in accordance with the present invention in the substantial absense of a solvent was carried out. A charge of 30,000 lbs. of dialkyl fumarate comprising a mixture of C-6 through C-18 dialkyl fumarate was charged to a reactor under a nitrogen blanket. An agitator was maintained in the reactor and was activated at this point. A charge of 4,550 lbs. of vinyl acetate, thereby producing a vinyl acetate to dialkyl molar ratio of about 0.82, was then added to the reactor. The reactor was then pressured to about 0.5 psig with nitrogen. The batch was then heated by steam to about 200° to 210° F. A charge of 55 lbs. of LUCIDOL 70, LUCIDOL 70 being a trademark of Pennwalt Company for a dibenzoyl peroxide composition, in 85 gallons of SN 150, a non-volatile hydrocarbon oil, was added to the initiator slurry system. SN 150 is not considered essential to the reaction, but was used here to assist in the delivery of LUCIDOL 70, which is a solid powder. It was present in an amount of about 2% of the fumarate charged thereto.

When the temperature of the reaction reached 200° to 210° F., the steam and condensate in the reactor jackets were drained and the jacket was then filled with a cooling liquid, namely water. The LUCIDOL 70 initiator slurry was then pumped at varying charging rates, and the batch temperature was maintained between 275° and 295° F. The reaction took about three to four hours. The reactor pressure was then slowly reduced to 0 psig. The batch was then vacuum-stripped at 275° to 295° F. with nitrogen sparge for three hours, and the product was then discharged. The product produced by this process is specified in TABLE 1 attached hereto. In addition, TABLE 1 also includes under the column identified as "SPECIFICATION" a standard commercial product specification for these products. The corresponding parameters for the product produced above in accordance with the present process are set forth in RUN #1 (BULK COPOLYMERIZATION PROCESS) and a compilation of data from product produced by a comparable commercial process currently in use, with a 8,100 lb. cyclohexane solvent present in an amount of about 27% of the dialkyl fumarate charge, are set forth in RUN #2 (SOLUTION PROCESS). In accordance with the latter data (RUN #2) the process did further differ from that of the present invention in that it was conducted at about 240° F., and at a lower pressure of about 11 psig. However, the reactant monomers and the amounts of reactants employed duplicated those employed in RUN #2. In the lower portion of TABLE 1 are set forth the results of various conventional performance tests, as well as the performance test specifications which serve as standards for these products. The results demonstrate that applicants have been successful in achieving highly acceptable commercial product in the substantial absence of a solvent, by utilizing the process of the present invention.

TABLE 1

| | SPECIFICATION | | | RUN #1 BULK COPOLYMER- IZATION PROCESS | RUN #2 SOLUTION PROCESS |
|---|---|---|---|---|---|
| | MIN | TARGET VALUE | MAX | | |
| COLOR, TAG ROBINSON | 10 | | | 15 | 15 |
| APPEARANCE | | | | BRIGHT & CLEAR | BRIGHT & CLEAR |
| FLASH, COC, °F. | 350 | | | 388 | 410 |
| FLASH, PM, °F. | 200 | | | 286 | — |
| KINEMATIC VISCOSITY, 210° F., CST | 300 | | 1200 | 750 | 847 |
| NUMBER AVG MOL WEIGHT, Mn | | | | 16850 | 14850 |
| ACTIVE INGREDIENTS, %, BY DIALYSIS | 85 | | | 86.7 | 87.8 |
| POUR POINT, °F. | | | 40 | 32 | — |
| PERFORMANCE TESTS | | | | | |
| 0.068 MASS % OF PRODUCT IN REFERENCE OIL STS-ENJ-204 SAE J-300 MRV USING TP1 COOLING CYCLE, AT −25° C. | | | | | |
| YIELD STRESS, PASCAL | | | 35 | <35 | <35 |
| APPARENT VIS, CENTISTOKES | | 11000 | 15000 | 13040 | 10227 |
| POUR POINT, °C. | | −36 | −33 | −33 | −33 |
| FEDERAL STABLE POUR CYCLE C, °C. | | | −32 | −38 | −35 |
| 0.085 MASS % OF PRODUCT IN REFERENCE OIL NUTO-H-32 | | | | | |
| DEMULSIBILITY TEST (ASTM D 1401) MINUTES TO 3 ML EMULSION | 20 | | 60 | 10 | 10 |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A process for the bulk copolymerization of vinyl acetate with a diester comprising reacting said vinyl acetate and a fumaric acid diester in the presence of a peroxide catalyst, said fumaric acid diester being derived from esterification of fumaric acid with straight chain $C_6$ to $C_{18}$ alcohol, the molar ratio of said vinyl acetate to said fumaric acid diester being less than 1, and permitting said reaction to proceed exothermically up to a predetermined reaction temperature of between 225° and about 320° F. in the substantial absence of an alkaline medium, and at elevated pressures, so as to produce a fumarate vinyl acetate copolymer therefrom having a number average molecular weight below about 50,000.

2. The process of claim 1 wherein said predetermined reaction temperature is maintained by cooling said reaction.

3. The process of claim 2 wherein said peroxide catalyst is added to said reaction mixture at a predetermined rate, and wherein said predetermined reaction temperature is maintained by controlling said predetermined rate.

4. The process of claim 3 wherein said cooling of said reaction is accomplished by heat exchange with said reaction mixture.

5. The process of claim 1 wherein said peroxide catalyst comprises a peroxide having a half-life of greater than about five minutes at 212° F.

6. The process of claim 5 wherein said peroxide catalyst comprises a dibenzoyl peroxide.

7. The process of claim 6 wherein said reaction is carried out at elevated pressures of between about 12 and 25 psig.

8. The process of claim 1 wherein the number average molecular weight of said copolymer product is controlled to be from about 14,000 to about 20,000 and wherein said predetermined reaction temperature is between about 275° and 295° F.

9. The process fo claim 8 wherein said catalyst comprises t-butyl peroctoate, and wherein said bulk copolymerization is conducted in the complete absence of a solvent.

* * * * *